April 14, 1970   J. E. WALDRUM   3,506,195

LOW VOLUME SPRAY METHOD

Filed May 15, 1968   2 Sheets-Sheet 2

INVENTOR
JOHN E. WALDRUM
BY
Caesar, Rivise,
Bernstein & Cohen
ATTORNEYS.

United States Patent Office 3,506,195
Patented Apr. 14, 1970

3,506,195
LOW VOLUME SPRAY METHOD
John E. Waldrum, Ambler, Pa., assignor to Amchem Products, Inc., Ambler, Pa., a corporation of Delaware
Continuation-in-part of application Ser. No. 648,462, June 23, 1967. This application May 15, 1968, Ser. No. 729,238
Int. Cl. B05b 17/04
U.S. Cl. 239—11          9 Claims

ABSTRACT OF THE DISCLOSURE

A low volume spray method for applying agricultural sprays, preferably concentrated herbicide compositions to an area having undesired vegetation, the method involving spraying the liquid material at a distance from 1 inch to 18 inches above the ground at a very constant rate to produce spray droplets, at least about 95% of which have a diameter greater than 400 microns and less than 2000 microns.

---

The present application is a continuation-in-part application based on copending application Ser. No. 648,462, filed June 23, 1967, now Patent No. 3,399,638 granted Sept. 3, 1968.

This invention relates to a method for applying low volumes of liquids such as agricultural sprays as exemplified by herbicides. In particular the invention is devoted to a method of applying low volumes of concentrated materials in an extremely uniform way.

The spraying of active materials generally is accomplished through the use of such materials in dilute form. This is because a dilute spray almost necessarily insures a uniform coverage. Relatively minor variations in flow rate or even in compounding are not significant in view of the dilute nature of the material being sprayed and the relatively high volumes under which spraying occurs.

In applying herbicides, similar practices are used. In particular it is quite normal to apply herbicidal mixtures at rates from 10 to 100 gallons per acre and sometimes even higher. In view of these large volumes, the only practical solvent is water, and thus, where the active ingredient is not soluble with water, additional difficulties arise with it being necessary to create some type of solution or emulsion which can be admixed with water.

Obviously, the handling of large volumes of liquid adds considerably to the expense of the spray operation. Furthermore, with systemic herbicides there is the problem of drift since the large spray rates and the use of high pressure atomizing nozzles necessarily creates many fine droplets which can be carried away by normal wind currents to unwanted areas.

A seemingly logical solution to the foregoing problem is to try to apply herbicides in concentrated form, but this type of spray method has largely proved to be unsuccessful, at least in the case of herbicides, in view of the requirement for uniform spray. Concentrated materials like insecticides have been applied with an atomizing spray, but here the production of fine particles does not present a problem since any misdirected particles of insecticides do not normally produce the deadly results of a systemic herbicide where even a few droplets can kill certain types of economic crops in a neighboring field.

In the case of a concentrated herbicide, if too little of the herbicide is applied, no herbicidal effect will be achieved. If too much herbicide is applied the excess is not only expensive, but there could be an adverse effect upon the economic crop.

In view of the foregoing, it has long been the practice to apply herbicides in dilute form since this at least achieves better control of the rate of application—although creating considerable expense in the large equipment that is necessarily required, as well as always presenting the ever present problem of a satisfactory water supply.

In addition to the foregoing, the farmer normally purchases the herbicide in concentrated form. He then has to become involved with the expense and trouble of admixing the herbicidal concentrate with large volumes of water. Where the herbicide is not sufficiently water soluble, it will also have to be formulated to prepare it for mixing with water.

It is therefore a prime object of the present invention to provide a low volume spray method where ideally the farmer will be able to purchase the herbicide in concentrated form and simply use it in that form, and thereby eliminate the time, expense and trouble which for many years has been an accepted part of the farmer's duties.

While the present invention is to be described in terms of concentrated herbicides, it is to be understood that the low volume spray method hereinafter described and claimed is suitable for use for other purposes, and while concentrated liquids are preferably used in the present low volume spray method, it is to be recognized that the present invention even has application with dilute liquids where a uniform application rate is to be maintained.

Yet another object of the present nvention is to provide a low volume spray method which will effect tremendous savings, and yet at the same time will bring about simpler techniques for the farmer.

The foregoing as well as other objects of the invention are achieved by providing a low volume spray method, for use in applying concentrated herbicides at a rate of from about ¼ to 2 gallons per acre (from about 1 drop per 2 square inches to about 5 drops per square inch), wherein the concentrated liquid is discharged at a distance from 1 to 18 inches above the target area, with at least 95% of the droplets so discharged having a diameter of at least 400 microns. In a preferred form of the invention there should be applied at least ½ gallon per acre (producing about 1 droplet per square inch), the application being made from a height of at least about 4 inches.

Other objects and many of the attendant advantages of this invention will be readily appreciated as the same becomes better understood by reference to the following detailed description.

The method of this invention may be effected in a number of different ways, usually by employing specialized spraying apparatus. A particular example of one type of such apparatus is that described and claimed in my copending application Ser. No. 648,462, filed June 23, 1967, the construction and operation of which will now be summarized with reference to the accompanying drawings wherein:

Figure 1:
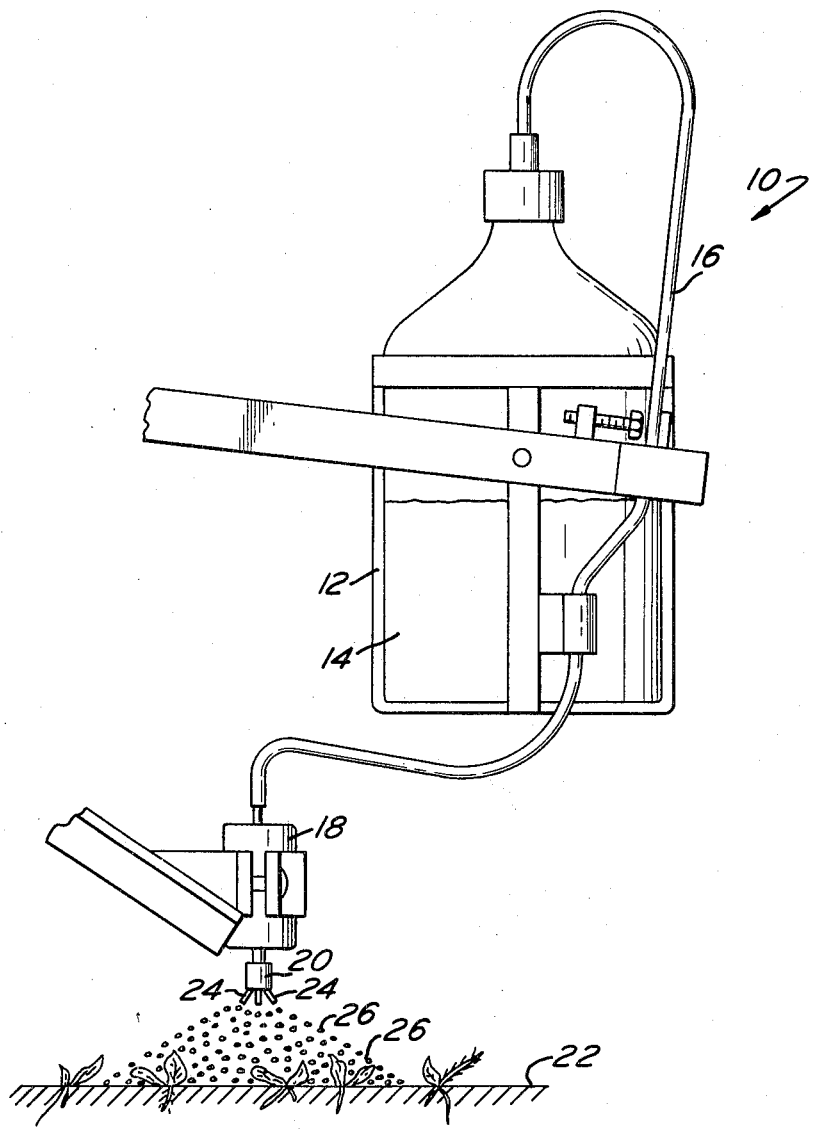
FIG. 1 is a partially schematic view showing a spray system applying concentrated herbicide in accordance with the low volume spray method of the present invention.

Reference is now made to FIG. 1 of the drawing, wherein like reference characters refer to like parts, which shows a preferred spray system that may be used to carry out the low volume spray method of the present invention. It is to be emphasized that other spray systems could be devised to carry out the low volume spray method of the present invention, and that even the simple use of a source of liquid and a spray head with appropriate constant head bands under proper control could achieve the uniformity as well as the other requirements of the low volume spray method of the present invention.

As shown in FIG. 1 a tank or reservoir 12 is provided in order to hold a supply of a concentrated agricultural liquid (like a herbicide) to be discharged through tubing 16, motor 18, then to rotating spray nozzle 20 and finally out through the four spray ports 24. It is to be noted that the spray nozzle 20 is positioned close to the ground 22 so that the spray ports 24 of the nozzle 20 are positioned at a distance from 1 to 18 inches above the ground.

The droplets emanating from nozzle 20 are rather large in size, with at least about 95% of such droplets having a diameter greater than 400 microns and less than 2000 microns. This large particle size, as well as the extreme uniformity of spray rate, is achieved by means of maintaining the discharge rate of liquid 14 through tubing 16 constant with essentially no variation irrespective of the height of the liquid 14 in the tank 12.

The liquid is led to a spindle (not shown) extending into motor 18 with the spindle having a bore to define a flow path for the agricultural liquid, and the spindle is rotated about an axis at a predetermined rate of the order of about 1000 r.p.m.

Further details of the spray apparatus 10 of FIG. 1 are set forth in aforesaid Patent No. 3,399,638, the disclosure of which is incorporated by reference. It is to be understood that the relatively large and uniform droplet pattern of the present invention being applied at the specified distance above the ground at a very constant rate can be achieved by hand or by other apparatus which would occur to those skilled in the art.

It is possible to achieve the relatively large droplet size by providing enlarged openings in the discharge nozzles of devices on the market, although the elimination of fine droplets is a matter of careful design.

Similarly, where a "constant head" feature is not to be incorporated into the apparatus, variations in discharge rate due to a changing head of liquid will have to be compensated for in some way, such as an overflow type tank which is in reality another form of a constant head device.

Figure 2:
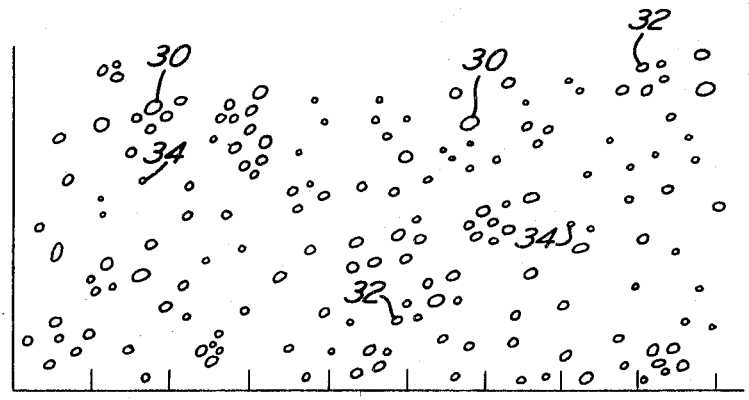
FIG. 2 is a view showing particle size distribution as obtained through the use of prior art atomizers.
Figure 3:
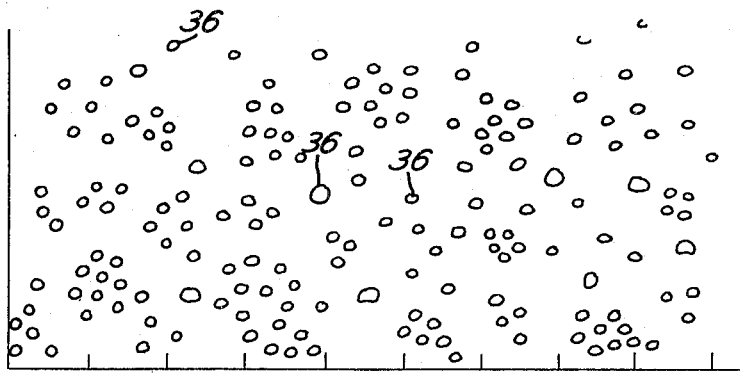
FIG. 3 is a view similar to FIG. 2 but showing the particle size distribution obtained in producing the low volume spray method of the present invention.

Reference is made to FIGS. 2 and 3 of the drawings which compare the spray pattern of a typical prior device with a spray pattern achieved with the present invention. FIG. 2 shows the spray pattern of a prior device which will contain large droplets 30, intermediate droplets 32 and fine droplets 34.

The fine droplets will, of course, tend to drift under normal air currents, and where the number of fine droplets is excessive there could be not only a substantial effective decrease in the rate of application where low volumes of liquids are being applied, but also there could be extensive damage to surrounding crops.

FIG. 3 shows the spray pattern achieved by the method of the present invention wherein the droplets 36 are essentially large, and wherein 95% of such droplets fall within the range of 300 microns to 2000 microns.

It is preferred that the lower range of droplet size start at 500 microns, and for the sake of uniformity the liquid should be applied so that there is deposited at least one drop per square inch.

The details of the spray system 10 of FIG. 1 are disclosed and claimed in copending application Ser. No. 648,462, filed June 23, 1967, and have been summarized only, but the disclosure of said application Ser. No. 648,462 is hereby incorporated by reference and considered a part hereof.

Uniformity of spray rate is very important in the successful application of concentrated herbicides. Also, there is the combination of large particle size and closeness to the ground which prevents undesirable drifting of the particles.

It has been determined that liquid particles having a diameter less than 400 microns are more susceptible to normal air currents than larger droplets, so it is a requirement of the present invention that at least about 95% of the droplets sprayed have a diameter of at least 400 microns and preferably more.

Indeed, in order to obviate completely the possibility of separative drift under normal wind conditions, a minimum droplet size of at least 500 microns is preferred. Furthermore, it is recommended that, in general, the droplet size be increased as the application height is increased. Thus, when spraying 4 inches from the target area a droplet size of 500 or 600 microns is quite satisfactory, however, when spraying from 18 inches, a droplet size of at least 1000 microns is recommended.

It has been determined that a workable upper limit for the particle size is about 2000 microns. Beyond this there is the danger that the extremely large droplet will itself subdivide, and thus produce unwanted fines.

As stated above, the spray method of this invention involves controlled spray application from a distance of from 1 to 18 inches from the target area, preferably of from at least 4 inches. These minimum distances are practical limitations, dictated by the area which is being sprayed. For example, when spraying very flat areas, it is possible to apply the liquid from a height as low as 1 inch.

However, the target area—for instance, a plowed field or a crop—is rarely uniformly flat, and therefore a minimum spray distance of about 4 inches is preferred in order to avoid damaging the applicator and in order to effect as uniform as possible a spray rate on the target. The maximum distance from the target area is set at about 18 inches, because at distances higher than that it becomes difficult to control overall drift—as opposed to separative drift—of the spray.

Furthermore, since even the best spraying apparatus will produce some smaller-than-average droplets, there may in practice be minor problems, at a distance greater than 18 inches, in preventing separative drift. Finally, since any droplet will tend to evaporate—and thus grow smaller—as it travels to the target area, the maximum distance of 18 inches is recommended to avoid this problem so as to reduce the resulting separative drift which could well occur.

Naturally a drop much smaller than 400 microns which has a considerable time in its flight pattern, could in some cases become extremely small and thus float for considerable periods of time and thereby be more likely to be carried by air currents or wind to an undesirable place.

The following test results are now given, though without any limitative effect, to demonstrate the advantages of the present invention over spray methods of the prior art.

In a typical spray achieved by the method of the present invention, the following distribution of spray droplets was obtained as set forth in Table 1.

TABLE 1.—SIZE-FREQUENCY DISTRIBUTION OF SPRAY DROPLETS (PERCENT)

| Diameter in microns | Nozzle | | | | |
|---|---|---|---|---|---|
| | 1 | 2 | 3 | 4 | 5 |
| Less than 300 | 0 | 1 | 0 | 0 | *6 |
| 301–400 | 0 | 5 | 0 | 1 | 21 |
| 401–500 | 0 | 0 | 1 | 0 | 28 |
| 501–600 | 3 | 3 | 3 | 4 | 17 |
| 601–700 | 13 | 23 | 1 | 5 | 11 |
| 701–800 | 17 | 24 | 2 | 7 | 8 |
| 801–900 | 26 | 15 | 19 | 17 | 5 |
| 901–1,000 | 25 | 10 | 20 | 12 | 2 |
| 1,001–1,100 | 10 | 8 | 13 | 17 | 2 |
| 1,101–1,200 | 2 | 9 | 25 | 16 | 0 |
| 1,201–1,300 | 2 | 0 | 6 | 6 | 0 |
| 1,301–1,400 | 0 | 0 | 4 | 5 | 0 |
| Greater than 1,401 | 0 | 0 | 5 | 10 | 0 |
| Percent over 400 | 100 | 94 | 100 | 99 | 27 |
| Percent over 500 | 100 | 94 | 99 | 99 | 55 |

1—Low volume nozzle, 6 x .016" openings.
2—Low volume nozzle, 6 x .020" openings.
3—Low volume nozzle, 4 x .024" openings.
4—Low volume nozzle, 4 x .033" openings.
5—Atomizing nozzle.
*A considerable number of particles were formed by this atomizing nozzle that were so small they floated away before their size and number could be recorded.

This distribution test was made using the apparatus described herein. It will be observed that, even when using apparatus specifically designed to give as uniform a spray as possible, there is still a distribution of drop sizes—in this case the average drop size (an average which applies to about 60% of the spray) is in the narrow range of 600 to 1200 microns, and that, with any particular nozzle, the main part of the spray is composed of droplets having a diameter within a range which extends only over 400 microns.

In order to demonstrate the effectiveness of the low volume spray method of the present invention a sprayer like that shown in FIG. 1 was fitted with a spray head to give a 10 inch spray band and spray rate of four gallons per acre on a broadcast basis.

TEST 1

The application was made from a height of 5½ inches using a No. 3 nozzle (see Table I). The majority of the droplets were in the size range 400 to 1200 microns.

The herbicide employed was Amiben (3-amino-2,4-dinitrobenzoic acid) at a concentration of one pound per gallon of water.

The test flats were first seeded with a mixture of pigweed, velvet leaf and barnyard grass and covered with a ½ inch layer of soil, and then thinly sprayed. The application rate was 4 pounds per acre (4 gallons of concentrate per acre). Fourteen days later the following results were observed:

TABLE II

| Speed of spray cart (m.p.h.) | Approximate speed of spray disc (r.p.m.) | Percent Control of— | | |
|---|---|---|---|---|
| | | Barnyard grass | Pigweed | Velvet leaf |
| 3* | 1,000 | 70 (stunted & chlorotic) | 100 | 100 |
| 2 | 1,000 | 95 | 100 | 100 |
| 2 | 1,000 | 90 | 100 | 100 |
| 2 | 1,400 | 99 | 100 | 100 |
| 2 | 1,400 | 99 | 100 | 100 |
| 2 | 2,100 | 95 | 100 | 100 |
| 2 | 2,100 | 90 | 100 | 100 |
| 2 | 3,000 | 99 | 100 | 100 |
| 2 | 3,000 | 99 | 100 | 100 |

*At this speed the spray rate was 3 lbs. per acre rather than 4 lbs. per acre.

The untreated, control test flats all showed vigorous weed growth.

The tests of Table II show excellent weed control employing the low volume spray method of the present invention. Furthermore, the herbicide was effective over large areas on a uniform basis.

TEST 2

Tests similar to that described just above have been carried out using other herbicides, in particular: Fenac (the sodium salt of 2,3,6-trichlorophenylacetic acid, in an aqueous medium); Sindone-B (1,1,4-trimethyl-6-isopropyl-5-indanylethyl ketone in an acetone medium); Atrazine (2-chloro-4-ethylamino-6-isopropylamino-1,3,5-triazine in an N-methyl pyrrolidone medium); Pyramin (5-amino-4-chloro-2-phenyl - 3-(2-H)-pyridazinone, in an N-methyl pyrrolidone medium); Diuron (N-(3,4-dichlorophenyl)-N',N'-dimethylurea, in an N-methyl pyrrolidone medium); and the methyl ester of Amiben (in an acetone medium).

The results of these tests are shown in Table III below. These tests were put down on a soil that varied from a clay loam to a Santa Isabel clay. The area was rotovated before application and a mixture of weed seed was broadcast over the test area (rye grass, barnyard grass, pigweed, mustard and coffeeweed). The sprayer was mounted behind a commercial planter used for planting tomatoes. Soybeans were planted into all test rows. All of the materials were applied as 2 lb./gal. formulation. The sprayer was adjusted to give an 18-inch band with a delivery from the nozzle of 28 ml./min. The tractor speed was 1 m.p.h. This gave a rate on a broadcast basis of 4.9 lbs./A. at a volume of 2.45 gal./A. Overhead irrigation was applied as follows:

2.5″ on 1-11-67
1.5″ on 1-20-67
1.5″ on 1-27-67
1.6″ on 1-30-67 (rain)

All of the plots were 100 feet in length. Ratings were taken 4 weeks after spraying.

The results are shown in the following table:

TABLE III

| Chemical | Average percent control | | | | |
|---|---|---|---|---|---|
| | Ryegrass | Barnyard | Pigweed | Mustard | Coffeeweed |
| Amiben (water solvent) | 100 | 100 | 100 | 100 | 100 |
| Fenac, Na salt (water solvent) | 100 | 100 | 100 | 100 | 100 |
| Sindone-B (acetone solvent) | 100 | 90 | 100 | 40 | 20 |
| Amiben, methylester (acetone solvent) | 90 | 100 | 100 | 60 | |
| Diuron (N-methyl pyrrolidone solvent) | 100 | 100 | 100 | 100 | 100 |
| Atrazine (N-methyl pyrrolidone solvent) | 100 | 100 | 100 | 100 | 100 |
| Pyramin (N-methyl pyrrolidone solvent) | 80 | 70 | 90 | 90 | |

All of these plots gave a clearly marked 18-inch band of weed control. There was excellent weed growth just outside the treated band. Within the band there was no indication of any skipped area. There was no injury to the soybeans in the Amiben, Amiben methyl ester, or Sindone-B plots.

Where any herbicide has shown itself to be selective in the dilute form, it has indicated similar favorable selectivity in the concentrated form when applied in accordance with the low volume spray method of the present invention.

The effect of wind on the spray method of the present invention has also been demonstrated. A comparison is made in Table IV of results obtained in static air conditions with results obtained in a six mile per hour crosswind, as well as of the results obtained for the method of the invention, with those of a prior art method. In order to determine drift effects, tomato plants were set downwind from the respective sprayers at a distance of approximately three feet from the spray nozzle.

The weeds sprayed were mustard, pigweed and crabgrass. The herbicide was Amiben, and was sprayed from a distance of 5½ inches, to give a 10-inch wide band, using a No. 3 nozzle (see Table I). The results were as follows:

TABLE IV

1. Sprayer of present invention (pre-emergence weed control)

| Rate | Wind (m.p.h.) | Tomato Epistany | Average percent weed control | | |
|---|---|---|---|---|---|
| | | | Mustard | Pigweed | Crabgrass |
| 2 lbs./A | 0 | 0 | 87 | 100 | 100 |
| 2 lbs./A | 6 | 5 | 83 | 100 | 100 |
| 4 lbs./A | 0 | 0 | 95 | 100 | 100 |
| 4 lbs./A | 6 | 5 | 95 | 100 | 100 |

2. Conventional atomizing sprayer (pre-emergence weed control)

| Rate | Wind (m.p.h.) | Tomato Epistany | Average percent weed control | | |
|---|---|---|---|---|---|
| | | | Mustard | Pigweed | Crabgrass |
| 2 lbs./A | 0 | 7.5 | 45 | 65 | 60 |
| 2 lbs./A | 6 | 40 | 35 | 40 | 40 |
| 4 lbs./A | 0 | 10 | 85 | 90 | 90 |

In certain of the foregoing tests the Amiben was applied at a rate of 2 lbs. per acre, and this was accomplished at a volumetric rate of concentrated Amiben of 1 gallon per acre. It can be seen that poorer weed control was obtained with the conventional sprayer as many of the fine spray droplets floated away. This drift was noticeable even under static air conditions and increased trenendously with a crosswind. Indeed the epistany effect n the tomatoes shows clearly that enough spray was caried away, as drift, to seriously damage neighboring plants. Vith the present invention, however, there was no signifiant amount of drift, even with the crosswind.

It is to be understood that a wide range of herbicides an be applied in concentrated form in accordance with he method of the present invention. Such herbicides inlude, without limitation, 2,4-dichlorophenoxyacetic acid, ,4,5-trichlorophenoxyacetic acid and Amiben.

The broad range of herbicides that can be sprayed in ccordance with the method of the present invention are ollectively referred to in the claims as "agricultural prays." However, this term is not necessarily limited to erbicides since it may encompass other active agents like nsecticides and fungicides. Furthermore, this term is not ecessarily limited to concentrated liquids, although the nethod of the present invention is generally carried out ising concentrated liquids.

The present invention also contemplates applying the gricultural sprays at a distance from 1 inch to 18 inches bove the ground or away from a target area at a very onstant rate. The precise distance above the target area vill depend upon the type of spray equipment being used s well as the ability to work in close to the target area which in some cases may be hindered by vegetation.

It will be understood that the distance from which the pray is applied and the size of the droplets sprayed depend on a number of features. In particular they can depend on the liquid being sprayed and the material onto which it is sprayed. For example, many herbicides are extremely insoluble in water, and will not extend laterally over the ground or plant they are sprayed on. Furthermore, various types of earth can prevent satisfactory dispersion of a sprayed liquid. For example, when spraying an easily absorbed liquid it is sufficient to spray large drops at a rate of about one in every 2 square inches. When spraying hard-to-absorb liquids, however, it is more convenient to employ smaller drops at a rate of four or five drops per square inch (while the amount of active ingredient per acre remains, of course, the same).

It is therefore seen that the present invention provides a method for applying low volumes of liquid, preferably concentrated herbicidal liquids, to undesired vegetation.

In so doing, the expense and trouble of handling large volumes of liquids is essentially eliminated, and the entire spraying process greatly simplified.

Without further elaboration, the foregoing will so fully illustrate our invention that others may, by applying current or future knowledge, adopt the same for use under various conditions of service.

What is claimed as the invention is:

1. A low volume spray method for applying agricultural spray to a target area, said method involving applying said spray at a distance from 1 inch to 18 inches away from said target area at a very constant rate, the droplets in said spray being relatively large with at least 95% of said droplets having a diameter greater than 400 microns and less than 2000 microns.

2. The invention of claim 1 wherein 95% of said droplets have a diameter greater than 500 microns and less than 2000 microns.

3. The invention of claim 1 wherein said droplets are applied in a coverage of 1 drop per 2 square inches to 5 drops per square inch to the target area.

4. The invention of claim 3 wherein said droplets are applied in a coverage of 1 drop per square inch to the target area.

5. The invention of claim 1 wherein said spray is applied at a rate from ¼ gallon per acre to 2 gallons per acre.

6. The invention of claim 5 wherein said spray is applied at a rate of ½ gallon per acre.

7. The invention of claim 1 wherein said distance is at least 4 inches and not greater than 18 inches.

8. A low volume spray method for applying agricultural spray to a target area, said method involving applying said spray at a distance from 4 inches to 18 inches away from said target area at a very constant rate, the droplets in said spray having a diameter greater than 500 microns and less than 2000 microns, with said spray being applied to the target area at a rate of from ½ gallon per acre to 2 gallons per acre.

9. The invention of claim 8 wherein said droplets are applied in an average coverage of about 1 drop per square inch to about 5 drops per square inch.

References Cited

UNITED STATES PATENTS

| | | | |
|---|---|---|---|
| 2,888,206 | 5/1959 | Waldrum | 239—224 X |
| 2,965,302 | 12/1960 | Waldrum | 239—77 |
| 3,194,194 | 7/1965 | Phelps | 111—6 |
| 3,369,506 | 2/1968 | Stralow et al. | 111—6 |
| 3,448,926 | 6/1969 | Knowles | 239—77 |
| 3,452,931 | 7/1969 | Knowles | 239—77 X |
| 3,399,638 | 9/1968 | Waldrum et al. | 111—6 |
| 3,443,756 | 5/1969 | Katz et al. | 239—222 X |

M. HENSON WOOD, Jr., Primary Examiner

J. J. LOVE, Assistant Examiner

U.S. Cl. X.R.

239—77, 222, 222.13